United States Patent
Takamori et al.

(10) Patent No.: US 8,044,945 B2
(45) Date of Patent: Oct. 25, 2011

(54) IMAGE DISPLAY APPARATUS AND METHOD, COMPUTER-READABLE RECORDING MEDIUM ON WHICH THE PROGRAM IS RECORDED, AND PHOTOGRAPH PRINT ORDER ACCEPTING APPARATUS

(75) Inventors: Tetsuya Takamori, Kanagawa-ken (JP); Meiji Itoh, Kanagawa-ken (JP); Fumito Takemoto, Kanagawa-ken (JP); Hajime Shirasaka, Kanagawa-ken (JP)

(73) Assignee: Fujifilm Corporation (JP)

( * ) Notice: Subject to any disclaimer, the term of this patent is extended or adjusted under 35 U.S.C. 154(b) by 762 days.

(21) Appl. No.: 11/540,548

(22) Filed: Oct. 2, 2006

(65) Prior Publication Data

US 2007/0076960 A1    Apr. 5, 2007

(30) Foreign Application Priority Data

Sep. 30, 2005    (JP) .................................. 2005-287017

(51) Int. Cl.
   *G09G 5/00*    (2006.01)
(52) U.S. Cl. ........................................ 345/204; 382/224
(58) Field of Classification Search .......... 345/156–172, 345/204, 87; 382/224–228
   See application file for complete search history.

(56) References Cited

U.S. PATENT DOCUMENTS

| | | | | |
|---|---|---|---|---|
| 6,636,648 | B2 * | 10/2003 | Loui et al. ...................... | 382/284 |
| 6,671,405 | B1 * | 12/2003 | Savakis et al. ................ | 382/203 |
| 2003/0058256 | A1 * | 3/2003 | Tanaka ........................... | 345/619 |
| 2003/0068100 | A1 * | 4/2003 | Covell et al. .................. | 382/305 |
| 2004/0258304 | A1 | 12/2004 | Shiota et al. | |
| 2005/0219666 | A1 * | 10/2005 | Ejima et al. .................... | 358/539 |

FOREIGN PATENT DOCUMENTS

| | | | |
|---|---|---|---|
| EP | 899666 A1 * | 3/1999 | |
| EP | 1450307 A2 | 8/2004 | |
| JP | 2004021440 A * | 1/2004 | |
| JP | 2005-141584 A | 6/2005 | |
| JP | 2005-141854 A | 6/2005 | |

OTHER PUBLICATIONS

The Extended European Search Report issued on Dec. 16, 2010; Application No. EP06020134.0-1522.

* cited by examiner

*Primary Examiner* — Stephen Sherman
(74) *Attorney, Agent, or Firm* — Studebaker & Brackett PC; Donald R. Studebaker

(57) ABSTRACT

An image display apparatus capable of displaying images in similar image groups to allow the user to determine the difference between the images in each of the similar image groups, and to select an image to be deleted or saved in easier and more efficient way. An evaluation value obtaining means calculates an evaluation value representing the desirability of an image for each of the images in each of the similar image groups using a predetermined evaluation criterion. A sorting means rearranges each of the images in each of the similar image groups in the order of the evaluation value to generate a display order. A display control means causes each of the images in each of the similar image groups to be displayed on a display section according to the display order.

11 Claims, 8 Drawing Sheets

FIG.10

SET EVALUATION CONDITION — 46

STATE OF MAIN SUBJECT

EXPRESSIVE-NESS  46D 46C 46B
[−]━━46A━▭━━━━[+]

FACE ATTRACTIVENESS
[−]━━━━━▭━━[+]

EMPHASIS ON SMILE
[−]━━▭━━━━[+]

IMAGE QUARITY

COLOR
[−]━━━▭━━━[+]

BRIGHTNESS
[−]━━━▭━━━[+]

CONTRAST
[−]━━━▭━━━[+]

SHARPNESS
[−]━━━▭━━━[+]

GRADATION · DYNAMIC RANGE
[−]━━━━━▭━━[+]

NOISE
[−]━━━━▭━━[+]

COMPOSITION

FACE SIZE
[−]━━━▭━━━[+]

FACE ORIENTATION (FRONT FACE PRIORITY)
[−]━━━▭━━━[+]

VISUAL LINE
[−]━━━▭━━━[+]

FACE LOCATION (CENTER PRIORITY)
[−]━━━▭━━━[+]

LEVELNESS
[−]━━━━━▭━━[+]

OTHERS

SHAKE
[−]━━━▭━━━[+]

DEFECT
[−]━━━▭━━━━[+]

[ CLOSE ] — 46E

IMAGE DISPLAY APPARATUS AND METHOD, COMPUTER-READABLE RECORDING MEDIUM ON WHICH THE PROGRAM IS RECORDED, AND PHOTOGRAPH PRINT ORDER ACCEPTING APPARATUS

BACKGROUND OF THE INVENTION

1. Field of the Invention

The present invention relates to an image display apparatus and method for displaying a plurality of images. It also relates to a computer-readable recording medium on which a program for causing a computer to execute control for realizing the image display method is recorded. Still further, the present invention relates to a photograph print order accepting apparatus incorporating the image display apparatus of the present invention.

2. Description of the Related Art

Digital cameras may provide an image at a lower cost compared to silver halide film cameras since they require no film cost. As a result, more and more images are obtained by digital cameras. This trend is further encouraged by increasingly larger capacity of recording media detachably provided to digital cameras. As a result, a great number of images are stocked in the recording media of digital cameras, and other recording media including hard disks and CD-R of personal computers and the like on which the image data read out from the recording media of digital cameras are recorded. Those images include both necessary images (good images) and unnecessary images (failed photographs, duplicated images, and the like), which are moreover often left ungroomed.

Organizing such a great number of images is a troublesome task. Consequently, apparatuses for assisting in searching/extracting necessary images, and extracting/deleting unnecessary images from the stocked images, or classifying/organizing stocked images based on the event, date and time, location, and the like are proposed.

One such apparatus is known as described, for example, in Japanese Unexamined Patent Publication No. 2005-141584. The apparatus displays a plurality of candidate images to be deleted at the same time, which are determined to be similar among candidate images to be deleted that satisfy a predetermined deletion criterion, and deletes an unnecessary image based on selection by the user.

As describe in the aforementioned patent publication, however, it is not easy for the user to recognize the difference between the displayed images, and to decide which image should be deleted (saved) even the similar candidate images to be deleted are collectively displayed at the same time.

The present invention has been developed in view of the circumstances described above, and it is an object of the present invention to provide an image display apparatus and method that allows the user to select an image to be deleted or saved from a group of images constituted by a plurality of similar images. It is a further object of the present invention to provide a computer-readable recording medium on which a program for causing a computer to execute control for realizing the image display method of the present invention is recorded. It is a still further object of the present invention to provide a photograph print order accepting apparatus that includes the image display apparatus of the present invention.

SUMMARY OF THE INVENTION

The image display apparatus of the present invention is an apparatus comprising:

an evaluation value obtaining means for obtaining an evaluation value representing the desirability of an image using a predetermined evaluation criterion for each image in a similar image group constituted by a plurality of similar images; and a display means for rearranging and displaying each of the images in the similar image group in the order of the obtained evaluation value.

Preferably, the "evaluation value representing the desirability of an image using a predetermined evaluation criterion" is a value representing the desirability of the image using the state of the main subject, composition, or quality of the image as the evaluation criterion. Specific examples of evaluation criteria related to the state of the main subject, when the main subject is a person may include: whether the person has a particular expression, including richness of expression, attractiveness, smile face; face orientation; open or closed eyes; visual line; extent of subject shake blur (extent of movement of the subject). Specific examples of evaluation criteria related to the composition of an image may include: the size or location of the main subject (face of the person, or the like) in the image; levelness of the image; presence of interference object against the main subject. Specific examples of evaluation criteria related to the quality of the image may include: desirability of the color, such as color reproducibility, white balance, and the like; sharpness of the image, such as brightness, density, contrast, blurness, and the like of the image or main subject in the image; focus level of the main subject; blur level of the background of a portrait; naturalness/texture of the gradation, dynamic range, or the like; noise, graininess, irregularity, or the like causing uncomfortableness; degree of camera shake, red eye, defect or missing level, or the like.

Preferably, the evaluation value described above is a comprehensive evaluation value using a plurality of evaluation criteria selected from those described above.

Further, a means for selecting one or more evaluation criteria from a plurality of evaluation criteria, each of which enables the evaluation value obtaining means to obtain an evaluation value may further be provided. When the comprehensive evaluation value is used as the evaluation value, a means for setting a contribution rate of each of the plurality of evaluation criteria to the comprehensive evaluation value may further be provided.

The referent of "rearranging and displaying each of the images in the similar image group in the order of the obtained evaluation value" may specifically means the case in which the arrangement order of a plurality of images displayed on a single screen corresponds to the order of the evaluation value, or the case in which the display order of a plurality of images displayed by switching them sequentially corresponds to the order of the evaluation value.

A configuration may be adopted in which an image analyzing means for analyzing a characteristic of each of a plurality of images, and a classifying means for classifying an image whose analysis result of the characteristic substantially satisfies a predetermined classification criterion into a similar image group are further provided in the image display apparatus described above, and the evaluation value obtaining means obtains the evaluation value for each of the images classified into the similar image group.

Here, a means for setting the predetermined classification criterion may further be provided.

Further, an image selection means for selecting an image to be deleted and/or saved from the images in the similar image group displayed in the order of evaluation value may further be provided in the image display apparatus described above.

A configuration may be adopted in which the display means further determines a candidate image to be deleted or a candidate image to be saved based on the evaluation value, and displays the image in such a manner as to be distinguishable from the others.

Preferably, in this case, the image having a highest evaluation value, i.e., the image evaluated as most desirable is selected as the candidate image to be saved. On the other hand, the candidate image to be deleted may be any image having a smaller evaluation value than a predetermined threshold value. Preferably, however, an image without any similar image is not selected as the candidate image to be deleted even if the image has a smaller evaluation value than the predetermined threshold value.

Preferably, the present invention is implemented as a photograph print order accepting apparatus, comprising:

the image display apparatus described above;

a means for accepting selection of an image to be printed from the plurality of images displayed on the image display apparatus;

a means for accepting inputs of printing conditions, such as print size, print quantity, and the like of the selected image; and a means for placing an order for printing the selected image according to the inputted printing conditions.

The image display method of the present invention is a method comprising the steps of:

obtaining an evaluation value representing the desirability of an image using a predetermined evaluation criterion for each image in a similar image group constituted by a plurality of similar images; and rearranging and displaying each of the images in the similar image group in the order of the obtained evaluation value.

The computer-readable recording medium of the present invention is a medium on which an image display control program is recorded. The program causes a computer to function as:

an evaluation value obtaining means for obtaining an evaluation value representing the desirability of an image using a predetermined evaluation criterion for each image in a similar image group constituted by a plurality of similar images; and a display control means for causing each of the images in the similar image group to be rearranged and displayed in the order of the obtained evaluation value.

According to the present invention, an evaluation value representing the desirability of an image is obtained for each image in a similar image group, and each of the images in the similar image group is rearranged and displayed in the order of the obtained evaluation value. This facilitates the user to recognize the difference between the displayed images and to determine which image is to be deleted (saved). Thus, the selection of the image to be deleted or saved may be performed by the user more efficiently.

If a configuration is adopted in which an evaluation criterion is selectable, or a contribution rate of each of a plurality of evaluation criteria is changeable, the images may be rearranged using the criteria desired by the user. This facilitate more effective and easier image selection by looking at the images arranged in the order of desirability adapted more to the user's preference.

Further, if a configuration is adopted in which a plurality of images is classified into each of the similar image groups, and the classification criterion used for the classification is settable, the user is allowed to change the structure of the similar image groups. This allows the user more efficient and easier image selection under the similar image groups adapted more to the overall tendency of the images and user's preference. For example, if a plurality of images has almost the same compositions and almost the same persons are imaged, the number of images belonging to one similar image group may be reduced to increase the number of similar image groups by narrowing the range of similarity. By setting the classification criterion according to the overall similarity of a plurality of images forming the population in the manner as described above, the range of similarity between the images may be set appropriately.

Still further, if a configuration is adopted in which a candidate image to be deleted or saved is determined and displayed in such a manner as to be distinguishable from the others, a more user-friendly display interface may be realized.

In this case, an image without any similar image is not selected as a candidate image to be deleted, and thereby the image without any alternative image is prevented to be deleted by mistake.

BRIEF DESCRIPTION OF THE DRAWINGS

FIG. 10 is a drawing illustrating an example evaluation condition setting screen.

DESCRIPTION OF THE PREFERRED EMBODIMENTS

Figure 1:
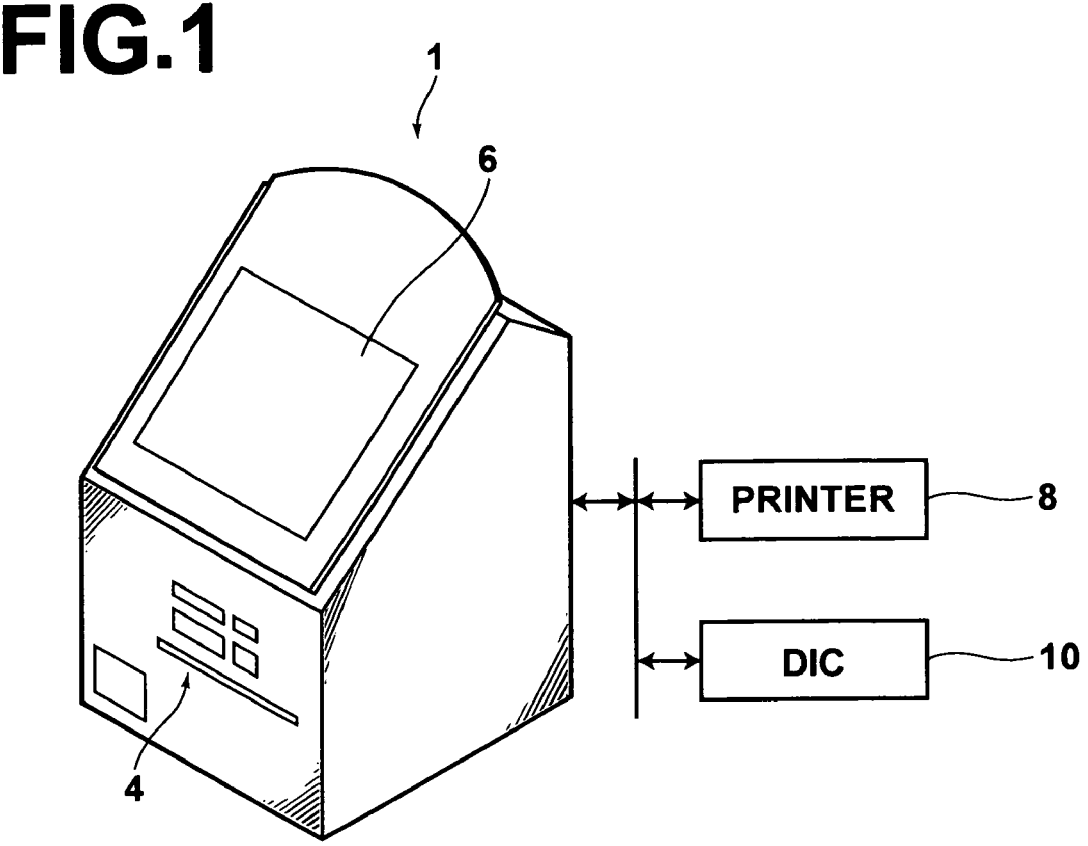
FIG. 1 is an external perspective view of an order accepting apparatus incorporating the image display apparatus according to an embodiment of the present invention.

Hereinafter, exemplary embodiments of the present invention will be described with reference to the accompanying drawings. FIG. 1 is an external perspective view of a photograph print order accepting apparatus incorporating the image display apparatus according to a first embodiment of the present invention. As shown in FIG. 1, the order accepting apparatus 1 according to the first embodiment is a photograph print order accepting apparatus installed at the front of a photo shop to accept image print orders from the users. The apparatus 1 includes: a plurality of different types of card slots 4 for accepting various types of memory cards 2 of the users on which images for placing print orders are recorded in order to read out the images therefrom or to record images thereon;

and a display section 6 for displaying various screens used for placing print orders. The apparatus 1 is connected to a printer 8 and a digital image controller (DIC) 10 for performing image processing on the images and managing print orders installed inside of the photo shop through a network. The display section 6 includes a touch panel type input section, and the user may provide inputs required for placing a print order or organizing images by touching the display section 6 according to the screen display of the display section 6.

Figure 2:
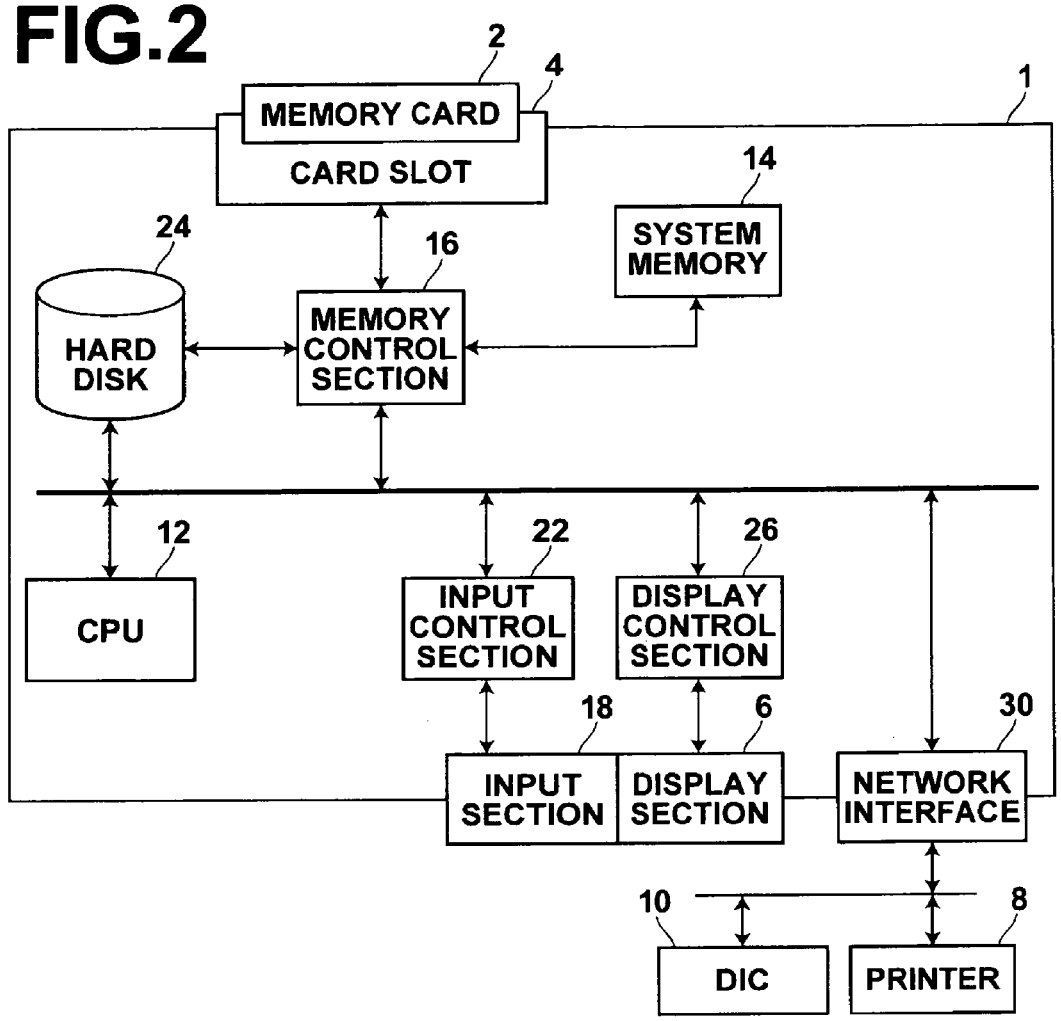
FIG. 2 is a schematic block diagram of the order accepting apparatus according to an embodiment of the present invention, illustrating the schematic construction thereof.

FIG. 2 is a schematic block diagram of the order accepting apparatus 1 according to the first embodiment, illustrating the configuration thereof. As shown in FIG. 2, the order accepting apparatus 1 includes a CPU 12 for providing various controls including recording control of image data representing an image, display control, and the like, and controlling each of the sections constituting the apparatus 1; a ROM on which basic programs for operating the apparatus 1 and various constants are recorded; a system memory 14 constituted by a RAM and serves as a working area for the CPU 12 when performing processing; a touch panel type input section 18 for giving various instructions to the apparatus 1; and the display section 6 described above.

The order accepting apparatus 1 further includes the card slots 4 described above; a hard disk 24 for storing images read out from the memory card 2, various programs executed by the CPU 12 for accepting and arranging image print orders, reference data, and the like; a memory control section 16 for controlling the system memory 14, card slots 4 and hard disk 24; a display control section 26 for controlling the display of the display section 6; an input control section 22 for controlling the input through the input section 18; and a network interface 30 for allowing the apparatus 1 to communicate with the printer 8 and DIC 10 through a network.

Although a plurality of card slots 4 is provided for accommodating different types of the memory card 2, only a single card slot 4 is indicated in FIG. 2 for clarity.

Processes performed by the order accepting apparatus 1, described later, are realized by executing the various programs stored in the hard disk 24. The various programs described above may be installed on the hard disk 24 from a computer readable recording medium, such as a CD-ROM or the like, on which they are recorded. The various programs include a main program for controlling the entire processing of the order accepting apparatus 1, and sub-programs for processing orders, grooming images, and the like, which are called by the main program as required.

Figure 3:
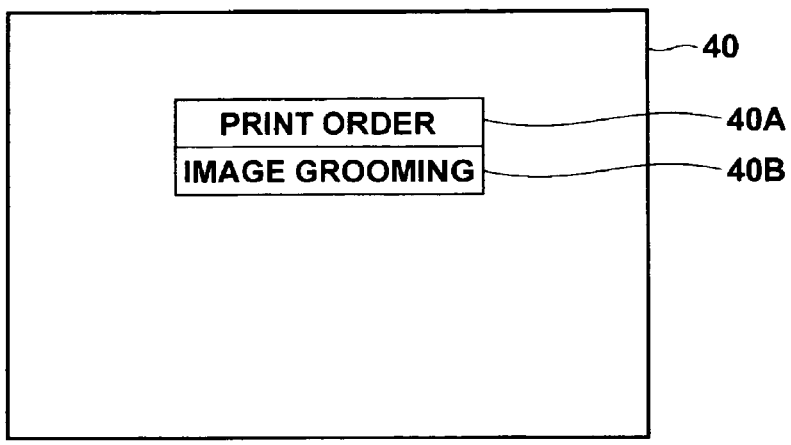
FIG. 3 is a drawing illustrating the initial screen of the order accepting apparatus.

The placement of a print order to the order accepting apparatus 1 constructed in the manner as described above is implemented in the following manner. FIG. 3 is a drawing illustrating the initial screen displayed on the display section 6 of the order accepting apparatus 1. The initial screen is displayed through control by the main program. As shown in FIG. 3, the initial screen 40 displays a print order button 40A for placing a print order, and an image grooming button 40B for performing image grooming, described later, including classification of a plurality of images, deletion of an unnecessary image, retention of a necessary image, and the like. Here, if the print order button 40A is selected by the user, the print order processing sub-program is called by the main program in the CPU 12, and the process according to this sub-program is performed. When a memory card 2 having recorded thereon a plurality of images is inserted in a card slot 4 by the user according to the instruction displayed on the screen, the plurality of the images are read out from the memory card 2 and tentatively stored in the hard disk 24. Further, the apparatus 1 displays a list screen of the plurality of images on the display section 6. The user selects an image for placing a print order from the list screen displayed on the display section 6, and specifies the number of prints to be made and the size thereof using the touch panel type input section 16. When a printing instruction is given by the user through the input section 16, order information that includes the image selected by the user, the number of prints to be made and the size thereof is sent to the DIC 10, where necessary image processing is performed on the image to improve the image quality, and the image is printed out from the printer 8 in the numbers and size included in the order information.

The image grooming process according to a first embodiment of the present invention will now be described. When the image grooming button 40B displayed on the initial screen shown in FIG. 3 is selected by the user, the image grooming sub-program is called by the main program and executed. In this way, the image grooming process is performed.

Figure 4:
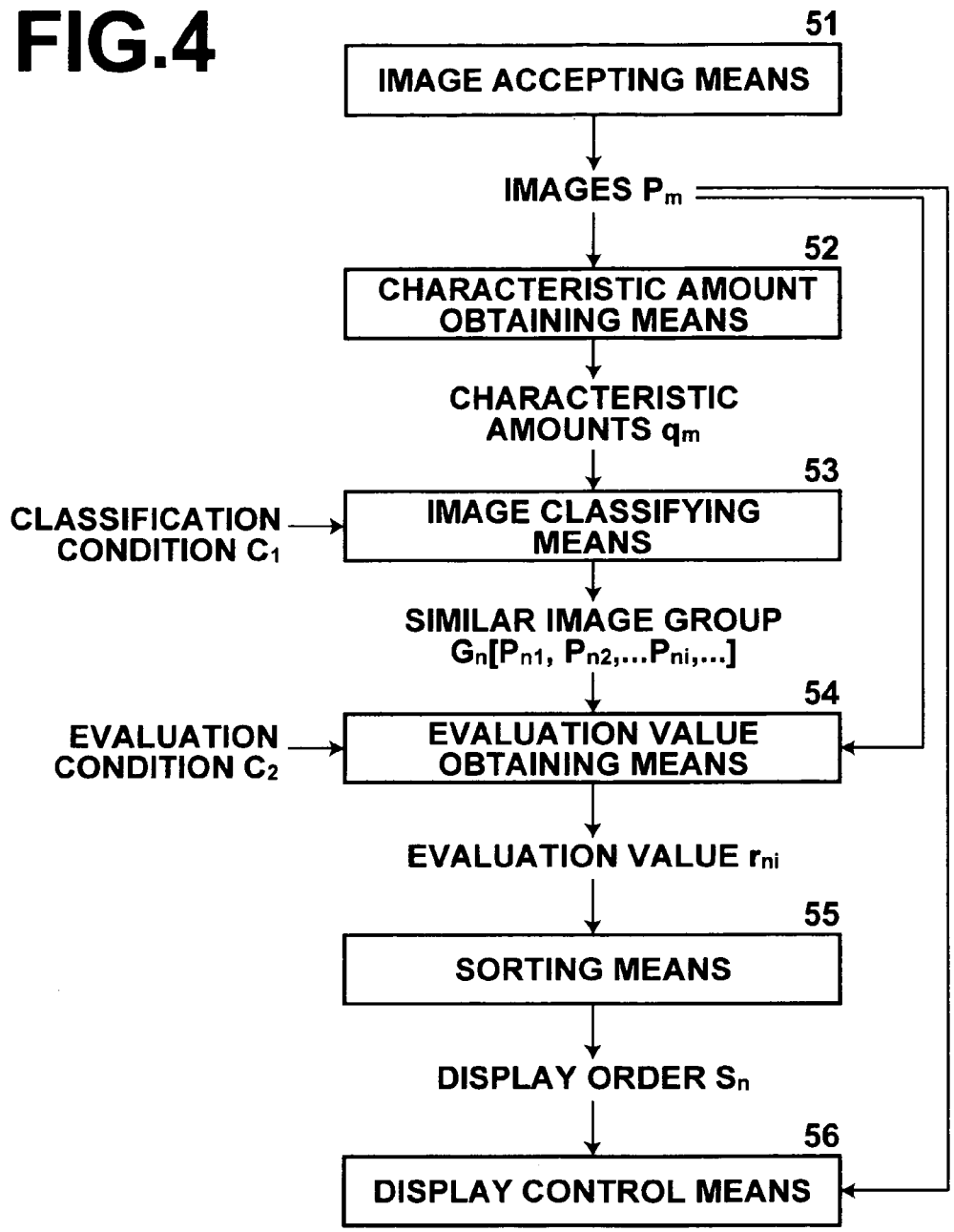
FIG. 4 is a schematic block diagram illustrating the flow of image display process according to a first embodiment of the present invention.

FIG. 4 is a schematic block diagram illustrating the flow of image display process realized by executing the image grooming sub-program. As shown in FIG. 4, the image display process is realized by: an image accepting means 51 for accepting a plurality of images $P_m$ (m=1, 2, and so on) from a memory card 2 of a user; a characteristic amount obtaining means 52 (corresponding to an image analyzing means) for performing image analysis on each of the accepted images $P_m$ to calculate characteristic amounts $q_m$ thereof; an image classifying means 53 for classifying the images $P_m$ into a plurality of similar image groups $G_n$ (n=1, 2, and so on, and images belonging to each of the similar image groups are referred to as $P_{n1}, P_{n2}, \ldots P_{ni}$) based on the characteristic amounts $q_m$ and a classification condition $C_1$; an evaluation value obtaining means 54 for calculating an evaluation value $r_{ni}$ for each of the images $P_{n1}, P_{n2}, \ldots, P_{ni}$ in each of the similar image groups $G_n$ based on an evaluation condition $C_2$; a sorting means 55 for generating a display order $S_n$ by rearranging each of the images $P_{n1}, P_{n2}, \ldots, P_{ni}$ in each of the similar image groups $G_n$ in the order of evaluation value $r_{ni}$; and a display control means 56 for causing the display section 6 to display each of the images $P_{n1}, P_{n2}, \ldots, P_{ni}$ in each of the similar image groups $G_n$ according to the display order $S_n$. The combination of the sorting means 55, display control means 56, display control section 26, and display section 6 corresponds to a display means.

When a user inserts its memory card 2 having recorded thereon a plurality of images into the card slot 4, the plurality of images $P_m$ (m=1, 2, and soon) is readout from the memory card 2 and tentatively stored in the hard disk 24 by the image accepting means 51.

The characteristic amount obtaining means 52 serially reads the images Pm (m=1, 2, and so on) from the hard disk 24, and obtains a plurality of characteristic amounts of each image, such as an edge characteristic amount through edge detection process, a color characteristic amount through color signal histogram process, a characteristic amount representing the shape or texture, and a characteristic amount representing the size or the like. In FIG. 4, these characteristic amounts are collectively expressed as $q_m$.

The image classifying means 53 compares each of the plurality of characteristic amounts obtained by the characteristic amount obtaining means 52 between the images. If the difference in the characteristic amount between the images is greater than a predetermined threshold value (classification condition $C_1$), the images are determined to be similar, and classified into the same similar image group. Here, taking into account the imaged date and time of the image, the similarity may be compared only between each image whose imaged date and time recorded in its Exif tag is close to each other (e.g., within a minute). Further, in the case where the main subject in the image is detected for use as the characteristic amount, if there is any difference in the size or composition of the main subject between two images, it would be conceivable that the similarity may be compared after transforming either of the images to conform to the other. Preferably, however, such images are determined to have a low similarity.

Further, the plurality of characteristic amounts obtained for each image may be treated as a single characteristic vector $q_m$ (m=1, 2, and so on), and the images $P_m$ may be classified into a plurality of similar image groups $G_n$ through a known clustering process that uses a characteristic vector $q_m$ corresponding to each of the images $P_m$ as described, for example, in Japanese Unexamined Patent Publication No. 2004-258750. In this case, the classification condition $C_1$ includes a number of clusters, a maximum allowable distance between the cluster center and the characteristic vector belonging to the cluster, and the like defined in advance.

The evaluation value obtaining means 54 obtains individual evaluation values $f_j$ (j=1, 2, and so on) for each of the images $P_{n1}, P_{n2}, \ldots, P_{ni}$ in each of the similar image groups $G_n$ using the state and composition of the main subject, image quality, and the like as the evaluation criteria. Calculation examples of various individual evaluation values will be described in the following.

For example, an individual evaluation value $f_1$ representing the face expressiveness of a particular person may be obtained in the following manner. That is, it may be obtained by: registering an image representing the average face (expressionless face) of the particular person in advance (stored in the hard disk 24 as the reference data); extracting the face region of the particular person from the inputted image $P_{ni}$; checking the extracted face image with the registered face image after conforming the size thereof to that of the registered face image; and calculating the individual evaluation value $f_1$ that represents face expressiveness by matching corresponding face parts of the two images if the extracted face image is determined to be the face image of the same person as the registered face image. For example, the individual evaluation value $f_1$ for the eyes may be obtained by Formula (1) below.

$$f_1=1-((\text{areas of overlapping regions of eyes between the two images})/\text{areas of registered eyes})) \quad (1)$$

Figure 5:
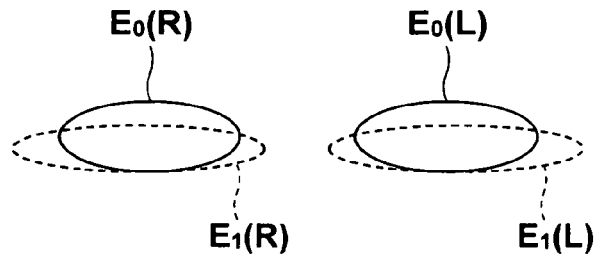
FIG. 5 is a drawing for explaining a case in which face expressiveness is determined based on the size and shape of eyes.

FIG. 5 schematically illustrates this. In FIG. 5, E0(R) indicates the area of the right eye of the registered face image, E0 (L) indicates the area of the left eye of the registered face image, E1 (R) indicates the area of the right eye of the inputted image $P_{ni}$, and E1 (L) indicates the area of the left eye of the inputted image $P_{ni}$. Thus, in Formula (1), the greater the difference in the areas of the eyes between the inputted and registered images, the greater the value of $f_1$, indicating more expressive.

Preferably, a less changeable region of a face in shape (ears, forehead, nose, or the like) is used for the cross-checking, and more changeable region of the face in shape (eyes, mouth, or the like) is used for calculating the individual evaluation value representing the expressiveness.

An individual evaluation value $f_2$ representing the overall expressiveness of the persons in an image may be obtained in the following manner. That is, it may be obtained by: detecting the shapes of the eyes and mouths of all the persons in the image; and defining the individual evaluation value $f_2$ such that the greater the average value of variation in the shapes of the eyes and mouth from the shapes of eyes and mouth thereof at normal state registered in advance, the greater the value of $f_2$ (more expressive as a whole). Further, an individual evaluation value $f_3$ representing the attractiveness of a person may be defined such that the smaller the difference between the face of the person and the average face obtained by averaging the faces of a plurality of persons (preferably obtained separately for men and women), the greater the value of $f_3$ (more attractive).

An individual evaluation value $f_4$ representing the probability of the subject shake blur may be defined as in the following, on the assumption that the greater the variation (travel distance) of the main subject between the frames of sequential photographs, the greater the probability of the subject shake blur. That is, it may be obtained by: detecting a same subject that moves through a plurality of frames; calculating the travel distance of the subject between each of the frames based on the location of the subject in each of the frames; and defining the individual evaluation value $f_4$ such that the greater the travel distance, the smaller the value of $f_4$ (higher probability of undesirable subject shake blur). As for the method of detecting the same subject as the main subject in which, for example, the face thereof is detected, a method may be conceivable, in which the face is detected in each frame of sequential photographs to determine if the faces are of the same person, or a method in which the face is detected from one or more frames of a plurality of frames of sequential photographs, and the other frames are checked to see if the detected face is present therein. Further, instead of the method based on the object detection described above, a further method may be conceivable, in which the difference of the image signals is obtained generally or locally between each of a plurality of frames; determining that the greater the difference value, the greater the travel distance of the subject between each of the frames; and allocating a smaller value to the individual evaluation value $f_4$. Still further, if the time intervals between each of the frames of sequential photographs are not constant, it may be determined that the greater the time change rate (slope) of the signal values, the greater the travel distance of the subject, thereby allocating a smaller value to the individual evaluation value $f_4$.

For an individual evaluation value $f_5$ representing the size of the face of a person in a portrait, it is conceivable that the individual evaluation value $f_5$ may be defined such that the greater the difference between the face size in the image and a predetermined appropriate face size, the smaller the value of $f_5$, or such that the greater the difference between the ratio of the face area in the image to the entire image area and an appropriate ratio thereof, the smaller the value of the individual evaluation value $f_5$, since excessively greater or smaller face size to the entire image is undesirable as a portrait.

Further, for an individual evaluation value $f_6$ representing the levelness of an image, a method may be conceivable in which a horizontal line in the image is detected by an discriminator generated by a known learning technique, and the individual evaluation value $f_6$ is defined such that the greater the angle formed between the detected horizontal line and the bottom end of the image, the smaller the value of $f_6$.

For an individual evaluation value $f_7$ representing the brightness of the main subject of an image, a method may be conceivable in which the main subject region in the image is detected; and brightness histograms are generated for the main subject region and the background region other than the main subject region; then the profiles of the histograms are compared with the profiles of appropriate brightness registered in advance and the individual evaluation value $f_7$ is defined such that the greater the difference, the smaller the value of the individual evaluation value $f_7$.

For an individual evaluation value $f_8$ representing the sharpness/defocus blur of an image, a method may be conceivable in which the main subject in the image is detected, determination is made that the smaller the integrated value of the high frequency component in the detected region, the higher the level of the defocus blur, and a smaller value is allocated to the individual evaluation value $f_8$. Alternatively, the individual evaluation value $f_8$ may be defined such that the greater the average edge width obtained from the image, the smaller the value of the individual evaluation value $f_8$. Still further, it may be defined such that the greater the average value of scores in each edge direction obtained by the following steps, the smaller the value of the individual evaluation value $f_8$, as described, for example, in Japanese Unexamined Patent Publication No. 2005-122721.

(1) detecting edges in a plurality of directions,
(2) calculating the average edge width in each edge direction,
(3) referring to a reference table that defines a score representing the level of sharpness/defocus blur for each edge width, and obtaining the score corresponding to the average edge width in each edge direction obtained in step (2) above. Here, the reference table is created by providing blurred and normal images for learning; generating a histogram of edge width distribution of the blurred image in the most heavily blurred direction, and a histogram of edge width distribution of normal images in the direction corresponding to the most heavily blurred direction of the blurred images; and defining the ratio of frequency rate of each edge width between the blurred and normal images as a score, and
(4) obtaining an average value of the scores in each edge direction.

Further, by applying the calculation method of the individual evaluation value $f_8$, an individual evaluation value $f_9$ representing blurriness of the background of an image may be defined. More specifically, a method may be conceivable in which the integration value, average edge width, and score described above are calculated for the background other than the main subject region of an image, and a determination is made that the greater the values, the more suitably the background is blurred, and a greater value is allocated to the individual evaluation value $f_9$.

For an individual evaluation value $f_{10}$ representing the extent of camera shake, for example, a method as described, for example, in Japanese Unexamined Patent Publication No. 2005-122721 may be used. In the method, edges in a plurality of directions are detected; a histogram of edge width obtained in each edge direction is created; a correlation value between the histograms of edge width in two orthogonal directions is obtained for each directional pair; and based on the average edge width in each direction and the correlation value between the histograms of edge width for each directional pair, the direction having a greater average edge width of the directional pair whose correlation value is smaller than a predetermined threshold value is determined as the camera shake direction, and the edge width orthogonal to the determined camera shake direction is determined as the camera shake width. Then, the individual evaluation value $f_{10}$ may be defined such that the greater the camera shake width, the smaller the individual evaluation value $f_{10}$.

Figure 6:
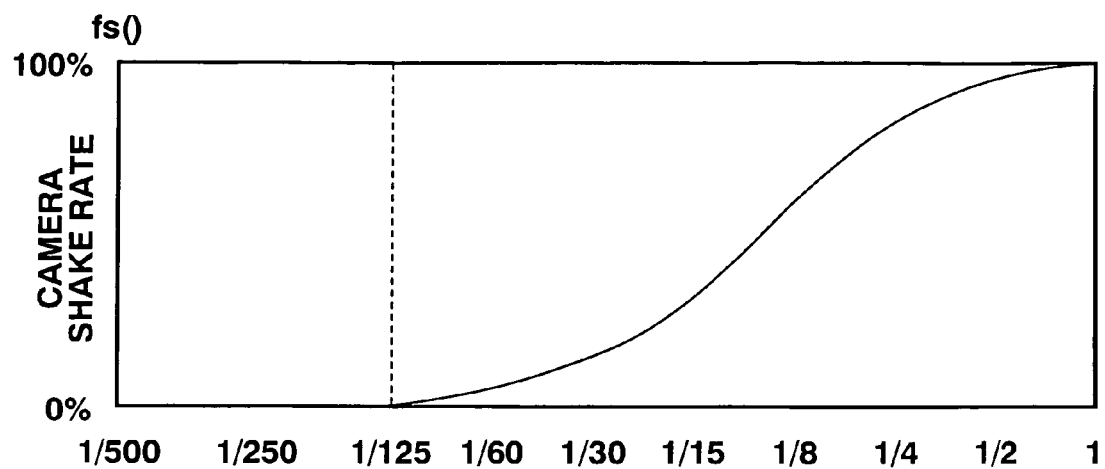
FIG. 6 is a graph illustrating the relationship between shutter speed and probability of camera shake.

Alternatively, the individual evaluation value $f_{10}$ may be defined such that the faster the shutter speed recorded in the Exif tag of image data, the smaller the individual evaluation value $f_{10}$ based on the fact that camera shakes are more likely to occur at slower shutter speeds as shown in FIG. 6.

An individual evaluation value $f_{11}$ representing the noise level of an image may be defined such that the greater the noise level, the smaller the individual evaluation value $f_{11}$ based on RMS (dispersion) or Wiener spectrum.

Further, an individual evaluation value $f_{12}$ representing the unevenness of an image may be defined such that the greater the components representing periodical unevenness, the smaller the individual evaluation value $f_{12}$, based on the output value representing periodicity obtained by frequency analysis, such as two dimensional fast Fourier transform.

In addition to those described above, the following may also be conceivable as the evaluation criteria. Namely, whether the face has a particular expression, such as smile or the like; orientation of the face; whether the eyes are open or closed; visual line; location of the main subject; whether an interference object is present against the main subject; color desirability, such as color reproducibility, white balance, and the like; naturalness including image brightness, density, contrast, gradation, dynamic range, and the like/uncomfortableness of texture, and the like; red eye; defect; missing level; and the like. For these, for example, an output value representing the state of an object detected by a known object detecting means for detecting the face, eyes, and the like may be obtained, or an output value representing the image quality may be obtained by a known image quality improving method or a known image evaluation method. Then, each of the individual evaluation values $f_j$ may be defined such that the smaller the difference between the obtained output value and the desirable reference value of each of the evaluation criteria, the greater the value of each of the evaluation values $f_j$.

The evaluation value obtaining means 54 calculates an overall evaluation value $r_{ni}$ representing the desirability of an image by Formula (2) below for each image in each of the similar image groups $G_n$ based on the individual evaluation values $f_j$ obtained in the manner as described above.

$$r_{ni} = \alpha_1 \times f_1 + \alpha_2 \times f_2 + \ldots + \alpha_j \times f_j + \ldots + \alpha_J \times f_J \tag{2}$$

Here, $\alpha_1, \alpha_2, \ldots \alpha_j \ldots \alpha_J$ are weighting factors of predefined individual evaluation values respectively, which correspond to the evaluation condition $C_2$ in FIG. 4. The method for obtaining the overall evaluation value $r_{ni}$ is not limited to the method that obtains a weighted sum of each individual evaluation value as in Formula 2 described above. It may be calculated by simple addition or multiplication of each individual evaluation values, or by other functions. Alternatively, a reference table that relates the value of each individual evaluation value to the value of the overall evaluation value $r_{ni}$ may be provided in advance, and the overall evaluation value $r_{ni}$ of each image may be obtained by referring to the reference table based on the individual evaluation values obtained for the image. Still further, the overall evaluation value $r_{ni}$ may be obtained based only on a single individual evaluation value.

The sorting means 55 rearranges the overall evaluation values $r_{n1}, r_{n2}, \ldots, r_{ni}$ of the respective images $P_{n1}, P_{n2}, \ldots, P_{ni}$ in each of the similar image groups $G_n$ in descending order to generate the display order $S_n$. The rearrangement may also be implemented in ascending order.

Figure 7:
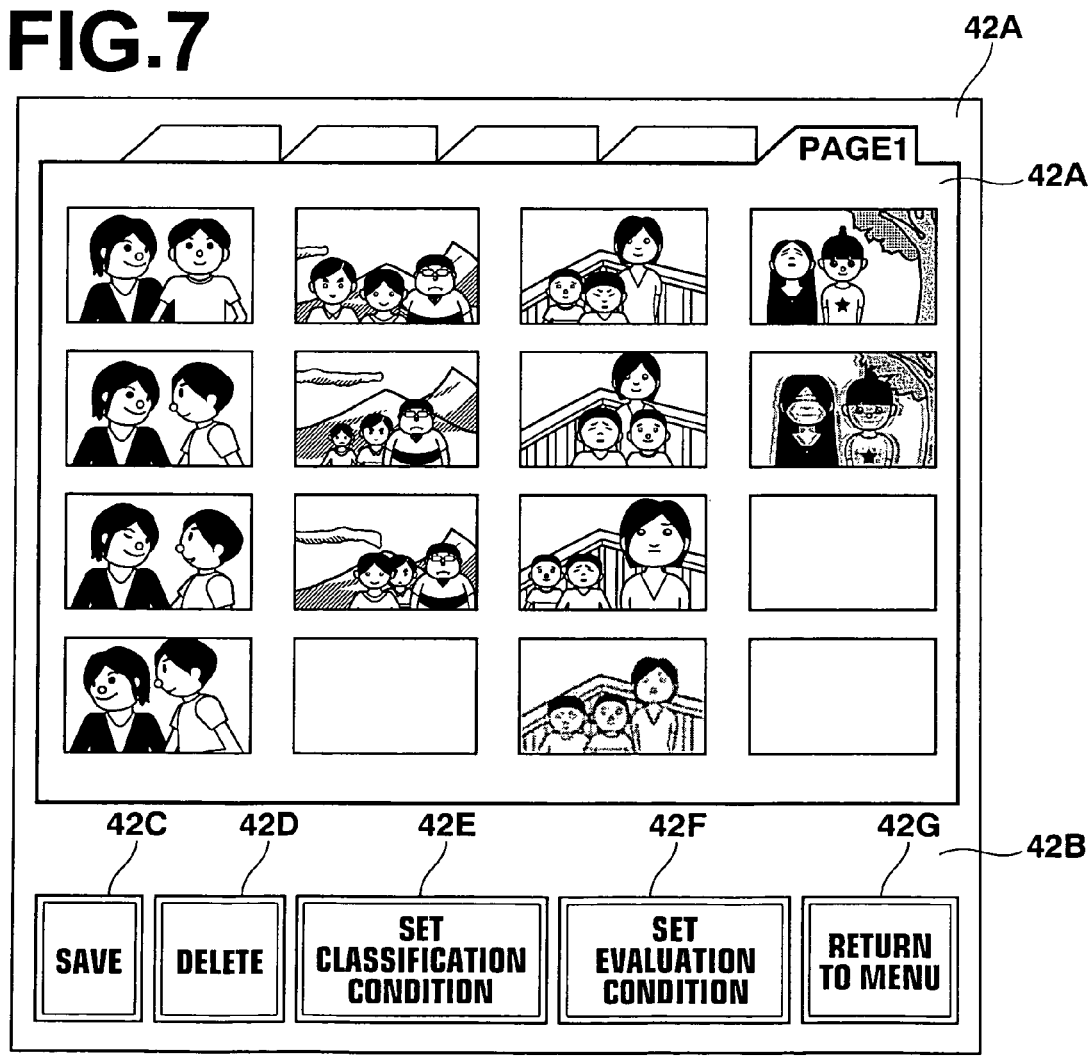
FIG. 7 is a drawing illustrating an example image list screen displayed in first and second embodiments of the present invention.

The display control means 56 determines the display layout of each of the images $P_{n1}, P_{n2}, \ldots, P_{ni}$ in each of the similar image groups $G_n$ according to the display order $S_n$ of each of the similar image groups $G_n$, and causes the display section 6 to display the images according to the layout. FIG. 7 shows an example screen displayed on the display section 6, in which the region 42A indicates the display layout. As shown in FIG. 7, each of the images $P_{n1}, P_{n2}, \ldots, P_{ni}$ in each of the similar image groups $G_n$ is disposed in a vertical line in descending order of the overall evaluation value based on the display order $S_n$. Thus, the upper image in each of the vertical columns is more preferable in the state or composition of the subject person, or in image quality, and the lower image in each of the vertical columns is less preferable in the state or composition of the subject person, or in image quality, such as the image in which the face of the person is not oriented to the camera, image in which persons are overlapping with each other, image in which the person is too small, image in which the position of the person is displaced from the center, or image of defocus blur or camera shake blur. The display format of each of the images $P_{n1}, P_{n2}, \ldots, P_{ni}$ is not limited to the listing display shown in FIG. 7. For example, a configuration may be adopted in which each of the images is sequentially displayed by switching one by one at predetermined time intervals based on the display order $S_n$.

By the image display process described above, a plurality of images $P_m$ (m=1, 2, ... ) inputted from the memory card by the user is classified into similar image groups $G_n$, and displayed in descending order of the overall evaluation value.

Looking at the screen display, the user selects images to be saved or deleted. More specifically, when the user selects an image by touching operation on the screen shown in FIG. 7, the selected image is highlighted in which the image frame is made thicker. Here, the touched position is detected by the input section 16, and the information of the touched position is sent to the CPU 12 through the input control section 22. Then, in the CPU 12, the image frame highlighting operation for the selected image is performed based on the control of the image grooming program under execution. If the user touches a save button 42C, only the selected image in each vertical column, that is, each similar image group is saved, and the data files of the other images are deleted. If the user touches a delete button 42D, instead of the save button 42C, the image data file of the selected image is deleted. Preferably, the deletion of the image data file at this time is performed only on the image data file temporarily stored in the hard disk 24, and the contents of the hard disk 24 are reflected in the memory card 2 inserted in the card slot 4 when a button for confirming the image grooming (not shown) is touched by the user.

As described above, in the first embodiment of the present invention, the overall evaluation value $r_{ni}$ of each of the images $P_{n1}, P_{n2}, \ldots, P_{ni}$ classified into each of the similar image groups $G_n$ by the image classifying means 53 is calculated by the evaluation value obtaining means 54; each of the $P_{n1}, P_{n2}, \ldots, P_{ni}$ is rearranged in the order of the overall evaluation value $r_{ni}$ by the sorting means to generate the display order $S_n$; and the display section 6 is caused by the display control means 56 to display images $P_{n1}, P_{n2}, \ldots, P_{ni}$ for each of the similar image groups according to the display order $S_n$. Thus, looking at the images arranged in the order of image desirability in each of the similar image groups, the user may make a selection on which image to be saved or deleted. This facilitates effective determination of the difference between each of the images displayed in each of the similar image groups and the image selection described above with ease.

An example modification of the present embodiment may be conceivable, in which the image of a maximum overall evaluation value $r_{ni}$ in each of the similar image groups is determined as a candidate image to be saved by the display control means 56, and the candidate image is highlighted on the screen display shown in FIG. 7. Further, a configuration may be adopted in which an image with the overall evaluation value $r_{ni}$ which is smaller than a predetermined threshold value in each of the similar image groups is determined by the display control means 56 as a candidate image to be deleted, and the candidate image is highlighted on the screen display shown in FIG. 7. Still further a configuration may be adopted in which both candidate images to be saved and deleted are determined by the display control means 56, and each of the candidate images is displayed in distinguishable manner, such as the candidate image to be saved is displayed with a thicker image frame, and the candidate image to be deleted is displayed with a flashing image frame. In this way, when an image to be saved or deleted is determined by the display control means 56, and the image to be saved or deleted is displayed in such a manner as to be distinguishable from the others, a more user-friendly display interface may be realized.

Preferably, when only a single image is present in a similar image group, then the image is not selected as a candidate image to be deleted, even if the overall evaluation value $r_{ni}$ thereof is smaller than a predetermined threshold value. This may prevent the image without any alternative image to be deleted by mistake to a certain extent.

A second embodiment of the present invention will now be described. In the first embodiment of the present invention, the classification condition $C_1$ and evaluation condition $C_2$ are predefined. But, how much similarity the images to be classified into one similar image group should have depends on the overall similarity and user's preference. For example, images inputted by the user are those obtained by a fixed-point observation of the Mt. Fuji, or those obtained by imaging the same person at the same location, all of the inputted images may possibly be classified into one similar image group, depending on the classification condition $C_1$. If that is the case, the classification of the images is meaningless. Further, which individual evaluation value should be emphasized in the desirability evaluation of the images depends on the overall tendency of the images and user's preference. Consequently, in the second embodiment of the present invention, the user is allowed to select the classification condition $C_1$ and evaluation condition $C_2$.

Figure 8:
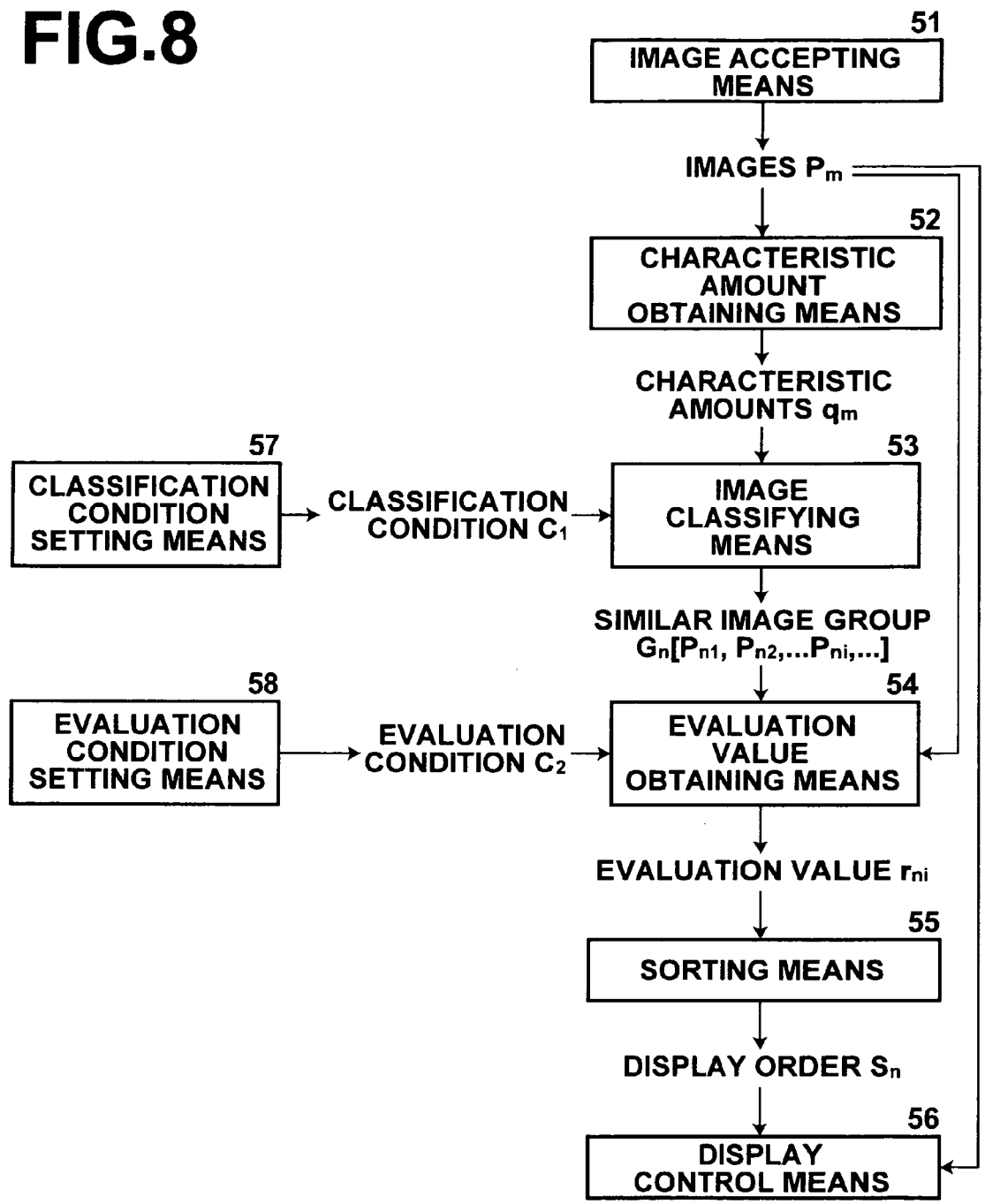
FIG. 8 is a schematic block diagram illustrating the flow of image display process according to a second embodiment of the present invention.

FIG. 8 is a schematic block diagram illustrating the flow of image display process according to the second embodiment of the present invention. As shown in the drawing, a classification condition setting means 57 and an evaluation condition setting means 58 are added to the block diagram of the first embodiment (FIG. 4). The external view of the order accepting apparatus 1 and the hardware configuration are identical to those of the first embodiment.

Figure 9:
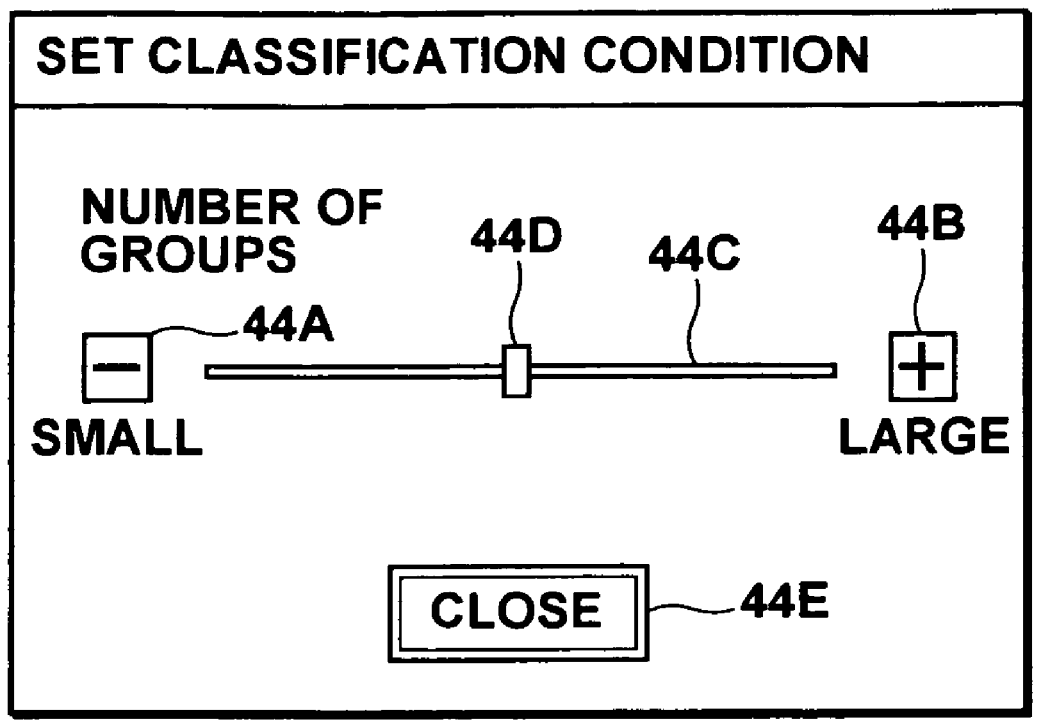
FIG. 9 is drawing illustrating an example classification condition setting screen.

FIG. 9 shows an example screen for setting the classification condition $C_1$. This screen is displayed as a separate window screen, when, for example, the user touches a classification condition setting button 42E on the screen shown in FIG. 7. The screen indicates that the "number of groups" may be increased or decreased through the screen in a manner which is readily understandable by the user. The position of a lever 44D on a slide bar 44C is a visualized setting of the current classification condition $C_1$. This position is determined by the classification condition $C_1$, i.e., set values of the threshold for determining similarity based on the difference in characteristic amounts between the images, number of clusters, maximum allowable distance between the cluster center and the characteristic vector belonging to the cluster, and the like.

When the user touches "−" button 44A, the position of the lever 44D is moved to the left by a predetermined distance, and when the user touches "+" button, it is moved to the right by a predetermined distance. The user touches "−" button 44A and/or "+" button 44B to place the lever 44D at a desired position, and touches "Close" button 44E after the position is fixed. The classification condition setting means 57 detects the position of the lever 44D at that time, calculates the value of the classification condition $C_1$ based on the detected position, and stores the calculated value in the memory as a new classification condition $C_1$. Then, the image classifying means 53 performs classification which is identical to that of the first embodiment based on the new classification condition $C_1$.

FIG. 10 shows an example screen for setting the evaluation condition $C_2$. This screen is displayed as a separate window screen, when, for example, the user touches an evaluation condition setting button 42F on the screen shown in FIG. 7. As shown in the FIG. 10, the contribution rate of each of the evaluation criteria obtainable by the evaluation value obtaining means 54 to the overall evaluation value is visualized by the position of a lever 46D on a slide bar 46C on the evaluation condition setting screen 46. More specifically, the contribution rate of each evaluation criterion corresponds to the weighting factor of each individual evaluation value in Formula (2) described above. If the position of the lever 46D is moved to the left end of the slide bar 46C, the evaluation criterion is not reflected at all in the overall evaluation value. Accordingly, by moving the lever 46D of the evaluation criterion unwanted to be included in the evaluation condition to the left end of the slide bar 46C, the evaluation criterion to be used as the evaluation condition may be selected in the manner similar to the elimination method.

For each evaluation criterion, the user touches "−" button 46A and/or "+" button 46B to place the lever 46D at a desired position, and touches "Close" button 46E after the position is fixed, as in FIG. 9. The evaluation condition setting means 58 detects the position of the lever 46D in each evaluation criterion at that time, determines the value of each of the weighting factors $\alpha_1, \alpha_2, \ldots \alpha_j \ldots \alpha_j$ of aforementioned Formula (2) based on each of the detected positions, and stores them in the memory as a new evaluation condition $C_2$. Then, the evaluation value obtaining means 54 performs evaluation which is identical to that of the first embodiment base on the new evaluation condition $C_2$. The operation of the other means is also identical to that of the first embodiment.

As described above, in the second embodiment of the present invention, the classification condition $C_1$ is set by the classification condition setting means 57 according to the user operation. This allows user to change the structure of the similar image groups, and more effective and easier image selection under the similar image groups adapted more to the overall tendency of the images and user's preference. Further, the evaluation condition $C_2$ is set by the evaluation condition setting means 58 according to the user operation. This allows image order rearrangement based on the weighting factors of the evaluation criteria desired by the user, and facilitates more effective and easier image selection by looking at the images arranged in the order of desirability adapted more to the user's preference.

An example modification of the second embodiment may be conceivable, in which only either one of the classification condition setting means 57 or the evaluation condition setting means 58 is provide. Preferably, the evaluation condition setting screen allows setting of the image rearrangement order in ascending or descending order of the overall evaluation value.

Figure 11:
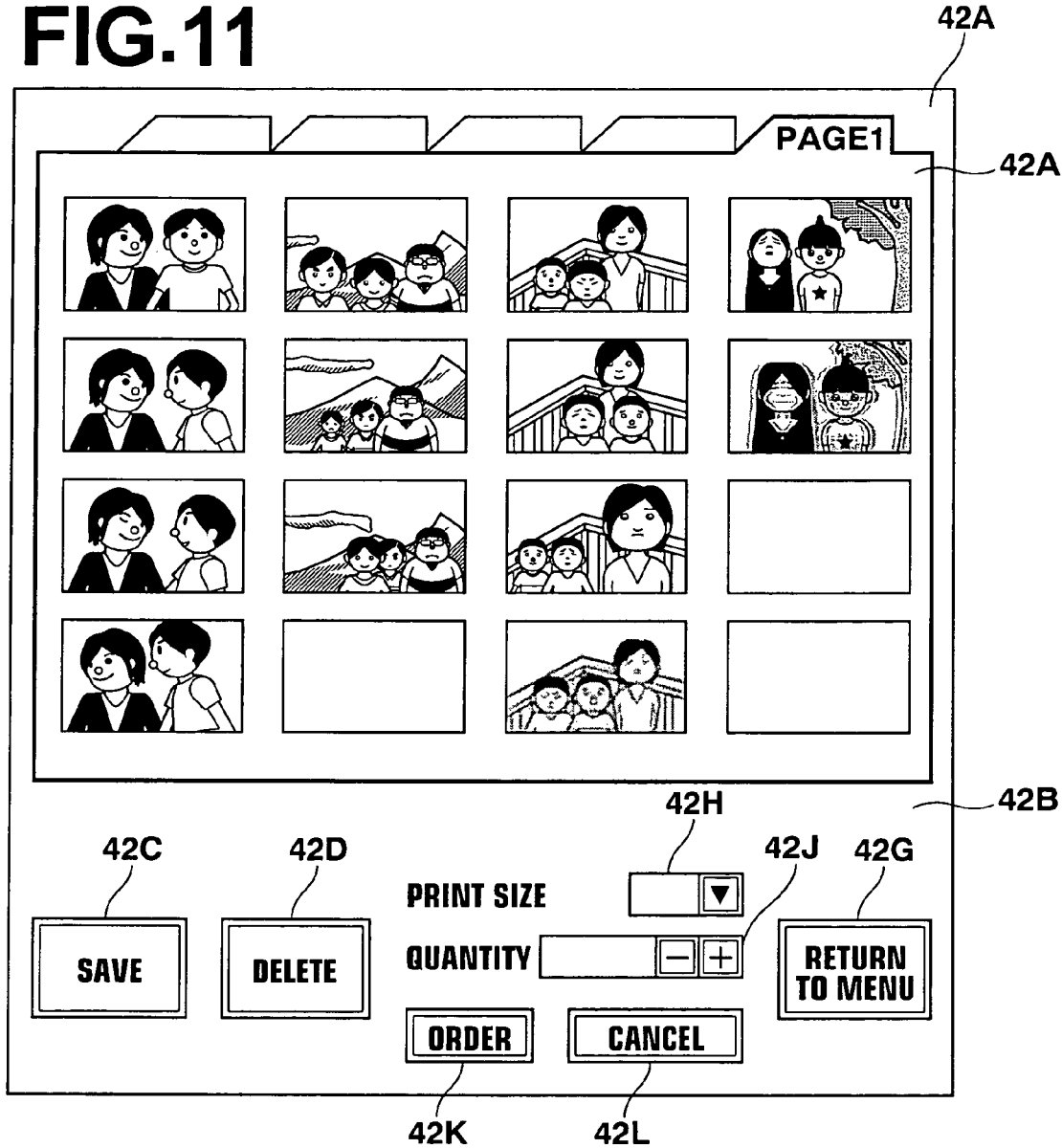
FIG. 11 is a drawing illustrating an example image list screen displayed in a third embodiment of the present invention.

Finally, FIG. 11 is a drawing illustrating an example screen displayed in a third embodiment of the present invention. The screen displays images after they are classified by the classification means 53 into similar image groups $G_n$, and rearranged by the display control means 56 according to the display order $S_n$ as in FIG. 7 in the first embodiment. The processing required for displaying this screen is identical to that of the first or second embodiment. The screen differs from that shown in FIG. 7 in that a print size setting section 42H, a quantity setting section 42J, an order button 42K, and a cancel button 42L are displayed instead of the classification condition setting button 42E and evaluation condition setting button 42F.

That is, the user selects an image to be printed by touching the image among the images displayed in the area 42A, selects the print size by touching a desired print size option among the options displayed by touching "▼" button of the print size setting section 42H, determines the print quantity by touching "+" button and "−" button of the quantity setting section 42J at desired times, and fixes an print order for the selected image by touching the order button 42K. The order of the selected image may be cancelled by touching the cancel button 42L. The specific print order process that follows is identical to the process after printing instruction is given through the input section 16 after the print order button 40A is touched on the initial screen shown in FIG. 3 and various operations are performed.

As described above, the third embodiment of the present invention accepts a photograph print order by displaying an image list which is arranged in the order of the overall evaluation value representing the desirability of the images in each of the similar image groups, as in the first and second embodiments. This allows the user to place a print order of a more desirable image in more efficient and easier way.

In the three embodiments described above, an example case in which the present invention is implemented in a photograph print order accepting apparatus installed in a shop front, such as a lab or the like. But, the present invention may also be implemented in a personal computer or a digital camera. Here, the touch panel serving as the input interface may be replaced by a mouse or a keyboard in the case of personal computer, and by various operation buttons in the case of digital camera. Further, the print order process in the third embodiment may be replaced by the print order process using a known network photo service system in the case of personal computer, and by the process in which print information is written into the tag of an image based on DPOF or the like in the case of digital camera. In this way, advantages similar to those of the embodiments described above may be obtained with a personal computer or a digital camera. In particular, the advantageous effects of automatically evaluating the desirability of the images and displaying them in the order of desirability are more significant with a digital camera, since it has a small display and it is difficult to visually determine the desirability of the images on the display.

What is claimed is:

1. An image display apparatus, comprising:
    an image analyzing means for detecting a main subject in images and calculating plurality of characteristics representing the detected main subject of said images; and
    a classifying means for classifying the images whose analysis result of the characteristics regarding the main subject are sufficiently similar to such a degree as to substantially satisfy a predetermined classification criterion, into on similar image group, and generating one or more similar image groups;
    an evaluation value obtaining means for obtaining an evaluation value representing the desirability of an image using a predetermined evaluation criterion for each said image in said one or more similar image groups, wherein the predetermined evaluation criterion includes at least one of the characteristics representing the main subject which is detected by the image analyzing means;
    a display means for rearranging and displaying each image in each of said one or more similar image groups, wherein, for each similar image group that includes plural images, the display means displays the plural images in said similar image group in the order of the obtained evaluation value;

an image selection means for selecting an image to be deleted and/or saved and/or printed from each of said one or more similar image groups having plural images displayed in the order of evaluation value, wherein the evaluation value is based on a plurality of evaluation criteria; and a means for setting a contribution rate of each of the plurality of evaluation criteria to the evaluation value, and the evaluation value obtaining means is adapted to calculate the evaluation value according to the contribution rate set on each of the plurality of evaluation criteria.

2. The image display apparatus according to claim 1, wherein:

the apparatus further comprises a means for selecting one or more evaluation criteria from a plurality of evaluation criteria, each of which enables the evaluation value obtaining means to obtain the evaluation value; and the evaluation value obtaining means obtains the evaluation value using the evaluation criterion selected by the selection means.

3. The image display apparatus according to claim 1, wherein:

the apparatus further comprises:

an image analyzing means for analyzing a characteristic of each of a plurality of images; and a classifying means for classifying an image whose analysis result of the characteristic substantially satisfies a predetermined classification criterion into a similar image group, and the evaluation value obtaining means obtains the evaluation value for each of the images classified into the similar image group.

4. The image display apparatus according to claim 3, wherein:

the apparatus further comprises a means for setting the predetermined classification criterion; and the classifying means performs classification using the classification criterion set by the setting means.

5. The image display apparatus according to claim 1, further comprising an image selection means for selecting an image to be deleted and/or saved from the images in the similar image group displayed in the order of evaluation value.

6. The image display apparatus according to claim 1, wherein the display means further determines a candidate image to be deleted based on the evaluation value, and displays the image in such a manner as to be distinguishable from the others.

7. The image display apparatus according to claim 6, wherein in the case where at least one of said one or more similar image groups is constituted by one similar image, the display means does not select the image which belongs to the similar image group constituted by one similar image as the candidate image to be deleted.

8. The image display apparatus according to claim 1, wherein the display means further determines a candidate image to be saved based on the evaluation value, and displays the image in such a manner as to be distinguishable from the others.

9. A photograph print order accepting apparatus, comprising:

the image display apparatus according to claim 1;

a means for accepting selection of an image to be printed from the plurality of images displayed on the image display apparatus;

a means for accepting inputs of printing conditions, which includes at least one of print size and print quantity of the selected image; and a means for placing an order for printing the selected image according to the inputted printing conditions.

10. An image display method, comprising the steps of:

detecting using an image analyzer to detect a main subject in images as a plurality of characteristics of said images; and classifying the images whose analysis result of the plurality of characteristics substantially satisfies a predetermined classification criterion, into on similar image group, and generating one or more similar image group;

obtaining an evaluation value representing the desirability of an image using a predetermined evaluation criterion for each said image said in one or more similar image groups, wherein the predetermined evaluation criterion includes at least one of the characteristics representing the main subject which is detected by the classifying step;

rearranging and displaying each image in said one or more similar image groups, wherein, for each similar image group that includes plural images, the display means displays the plural images in said similar image group in the order of the obtained evaluation value;

selecting using an image selection means to select an image to be deleted and/or saved and/or printed from each of said one or more similar image groups having plural images displayed in the order of evaluation value, wherein the evaluation value is based on a plurality of evaluation criteria; and a means for setting a contribution rate of each of the plurality of evaluation criteria to the evaluation value, and the evaluation value obtaining means calculates the evaluation value according to the contribution rate set on each of the plurality of evaluation criteria.

11. A computer-readable recording medium storing a program including instructions that when executed, cause a computer to function as:

an image analyzer means for detecting a main subject in images as a plurality of characteristics of said images; and a classifying means for classifying the images whose analysis result of the characteristic substantially satisfies a predetermined classification criterion, into on similar image group, and generating one or more similar image groups;

an evaluation value obtaining means for obtaining an evaluation value representing the desirability of an image using a predetermined evaluation criterion for each said image in said one or more similar image groups, wherein the predetermined evaluation criterion includes at least one of the characteristics representing the main subject which is detected by the image analyzing means;

a display control means for causing each of the images, wherein, for each similar image group that includes plural images, the display control means displays the plural images in said one or more similar image groups in the order of the obtained evaluation value;

an image selection means for selecting an image to be deleted and/or saved and/or printed from each of said one or more similar image groups having plural images displayed in the order of evaluation value, wherein the evaluation value is based on a plurality of evaluation criteria; and a means for setting a contribution rate of each of the plurality of evaluation criteria to the evaluation value, and the evaluation value obtaining means calculates the evaluation value according to the contribution rate set on each of the plurality of evaluation criteria.

* * * * *